(12) United States Patent
Yoshida et al.

(10) Patent No.: US 11,934,073 B2
(45) Date of Patent: Mar. 19, 2024

(54) LIQUID CRYSTAL PANEL, DISPLAY DEVICE, AND DIMMING DEVICE

(71) Applicant: Sharp Display Technology Corporation, Kameyama (JP)

(72) Inventors: Takehisa Yoshida, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/230,205

(22) Filed: Aug. 4, 2023

(65) Prior Publication Data

US 2024/0053644 A1    Feb. 15, 2024

(30) Foreign Application Priority Data

Aug. 9, 2022    (JP) .................................. 2022-127422

(51) Int. Cl.
*G02F 1/1362* (2006.01)
*G02F 1/1343* (2006.01)
*G02F 1/1368* (2006.01)

(52) U.S. Cl.
CPC .. *G02F 1/136286* (2013.01); *G02F 1/134309* (2013.01); *G02F 1/136209* (2013.01); *G02F 1/1368* (2013.01)

(58) Field of Classification Search
CPC ............. G02F 1/1333; G02F 1/133345; G02F 1/1343; G02F 1/134309; G02F 1/1362; G02F 1/136209; G02F 1/136218; G02F 1/136272; G02F 1/136286; G02F 1/1368
See application file for complete search history.

(56) References Cited

U.S. PATENT DOCUMENTS

2017/0052414 A1*   2/2017   Cheng ............... G02F 1/133753
2021/0304686 A1    9/2021   Shimoshikiryoh et al.

FOREIGN PATENT DOCUMENTS

WO    2008/053724 A1    5/2008

* cited by examiner

*Primary Examiner* — Thoi V Duong
(74) *Attorney, Agent, or Firm* — ScienBiziP, P.C.

(57) ABSTRACT

A liquid crystal panel is a normally-black mode segment liquid crystal panel, and includes a plurality of pixels that are arrayed in substantial tessellation of an active region, as viewed from a direction of the normal of a first substrate, and a plurality of auxiliary electrodes that each have a portion that overlaps a gap between two pixels that are adjacent to each other, as viewed from the direction of the normal of the first substrate. A plurality of pixel electrodes, a common electrode, the plurality of auxiliary electrodes, and portions of a plurality of signal lines that are present in the active region are made of a transparent electroconductive material. The auxiliary electrodes are electrically connected to one of two pixel electrodes of the two pixels.

29 Claims, 12 Drawing Sheets

LIQUID CRYSTAL PANEL, DISPLAY DEVICE, AND DIMMING DEVICE

BACKGROUND

1. Field

The present disclosure relates to a liquid crystal panel, a display device, and a light control device.

2. Description of the Related Art

A segment liquid crystal panel is used, for example, as a light control panel that is disposed between a transmissive liquid crystal display panel and a backlight, and that adjusts, out of light emitted from the backlight, the amount of light that is radiated on each portion of the liquid crystal panel (e.g., International Publication No. 2008/053724).

Now, segment driving refers to driving in which signal voltage corresponding to each pixel electrode (e.g., each segment electrode) is applied at substantially the same time. The term "substantially the same time" allows for temporal deviation of a level that does not adversely affect display, like flickering and so forth, such as deviation within 100 ms for example. In a thin-film transistor (TFT) liquid crystal display panel, signal voltage is applied to each pixel electrode only during periods in which gates of corresponding TFTs are on, and pixel capacity that includes each pixel electrode, a common electrode, and a liquid crystal layer therebetween only maintains the applied voltage during the remaining period of a frame period. On the other hand, in a segment liquid crystal panel, signal voltage is directly supplied to each pixel electrode (each segment electrode) from a source driver via signal lines over a predetermined period (e.g., frame period).

International Publication No. 2008/053724 discloses a segment liquid crystal panel, having following features, for light control in normally-black mode.

In the liquid crystal panel described in International Publication No. 2008/053724, a plurality of pixels (pixel electrodes) of which outer shapes are substantially regular hexagons, are arrayed in tessellation in an active region. Arraying pixels in this way results in all pixels adjacent to a certain pixel being adjacent at a boundary line in a lateral direction or an oblique direction, and change in luminance is smooth since the pixels are not in contact at points. Further, a structure is made in which the boundaries of pixels are formed with recessed and protruding forms, and part of adjacent pixels enter into each other near the boundaries thereof. Employing such a structure enables portions between adjacent pixels to be kept from becoming dark. Segment liquid crystal panels do not have a black matrix, which is used in TFT liquid crystal display panels to block light between pixels, and accordingly, employing the above-described structure enables luminance distribution among pixels to be smooth, and an overall natural luminance distribution can be obtained.

On the other hand, according to U.S. Patent Application Publication No. 2021/0304686, a zigzag boundary line between pixels does not smoothly change luminance distribution, and instead forms a dark zigzag line between the pixels. In order to suppress this, a liquid crystal panel having the following features is disclosed in U.S. Patent Application Publication No. 2021/0304686.

In the liquid crystal panel described in U.S. Patent Application Publication No. 2021/0304686, each pixel electrode has a base electrode having a plurality of apertures, and a plurality of island electrodes that are electrically connected to the base electrode and are discretely disposed around the base electrodes, such that the area occupied by the plurality of island electrodes decreases toward the outer side of the pixel electrode. Further, part of the island electrodes of a certain pixel electrode are disposed at an aperture of an adjacent pixel electrode or between two island electrodes thereof. According to U.S. Patent Application Publication No. 2021/0304686, luminance distribution among pixels can be made smooth by configuring the pixel electrodes in this way.

Description is further made that providing a lower-layer electrode that is disposed so as to overlap, in plan view, a gap between an aperture that a base electrode of a certain pixel has and an island electrode of an adjacent pixel electrode that is disposed in this aperture, and that is electrically connected to the base electrode, enables occurrence of dark lines due to defective alignment of liquid crystal molecules at the gap to be limited.

According to study performed by the present inventors, when white is displayed on a segment liquid crystal panel that operates in a normally-black mode in which a plurality of pixels are arrayed in tessellation in an active region such as in the liquid crystal panel described in International Publication No. 2008/053724, for example, there are cases in which disturbance occurs in alignment of the liquid crystal molecules among the pixels, and dark lines are formed. These dark lines that are formed between pixels are manifested in both the vertical electric field mode and the lateral electric field mode.

Providing the lower-layer electrode according to U.S. Patent Application Publication No. 2021/0304686, for example, in order to reduce occurrence of dark lines is conceivable. However, providing the lower-layer electrode according to U.S. Patent Application Publication No. 2021/0304686 to the liquid crystal panel described in International Publication No. 2008/053724, for example, will not yield the same advantages as in the liquid crystal panel of U.S. Patent Application Publication No. 2021/0304686. The reason is that the electrode structure in the periphery of the gap where the dark line is formed differs between International Publication No. 2008/053724 and U.S. Patent Application Publication No. 2021/0304686. In the configuration of U.S. Patent Application Publication No. 2021/0304686 one island electrode is provided in an aperture of one base electrode that is adjacent, and the lower-layer electrode is electrically connected to the base electrode. That is to say, the gap in the configuration of U.S. Patent Application Publication No. 2021/0304686 is formed between one island electrode and one base electrode of one adjacent pixel. Conversely, the gap in the configuration of International Publication No. 2008/053724, in which the dark line is formed, is present between two pixel electrodes that are adjacent. One regular hexagonal pixel electrode, for example, is adjacent to six different pixel electrodes, and accordingly providing one lower-layer electrode (annular) to overlap with gaps around the one pixel electrode will not sufficiently reduce dark lines. There further is a problem in that uniformly disposing lower-layer electrodes in all pixel electrodes is not implementable.

It is desirable to reduce formation of dark lines among pixels in a white display state of a normally-black mode segment liquid crystal panel, in which a plurality of pixels are arrayed in tessellation in an active region. It is also desirable to provide a display device and a light control device that have such a segment liquid crystal panel. According to an embodiment of the present disclosure, solutions described in the following items are provided.

SUMMARY

According to an aspect of the disclosure, there is provided a liquid crystal panel, including a first substrate, a second substrate, a liquid crystal layer disposed between the first substrate and the second substrate, an active region in which a plurality of pixels are arrayed, each of the plurality of pixels including the liquid crystal layer, and a pixel electrode and a common electrode for applying voltage to the liquid crystal layer, a frame region on a periphery of the active region, a plurality of signal lines, each of which being electrically connected to a pixel electrode of a corresponding pixel out of the plurality of pixels, and a plurality of auxiliary electrodes. The liquid crystal panel is a normally-black mode liquid crystal panel that is configured to apply signal voltage corresponding to the plurality of signal lines at substantially the same timing. The plurality of pixels are arrayed in substantial tessellation in the active region, as viewed from a direction of the normal of the first substrate. Each of the auxiliary electrodes has a portion that overlaps a gap between two pixels that are adjacent to each other, as viewed from the direction of the normal of the first substrate. A plurality of pixel electrodes, each of which being the pixel electrode for applying voltage to the liquid crystal layer, the common electrode, the plurality of auxiliary electrodes, and portions of the plurality of signal lines that are present in the active region are made of a transparent electroconductive material. Each of the plurality of auxiliary electrodes is electrically connected to one of two pixel electrodes of the two pixels.

According to another aspect of the disclosure, there is provided a display device including the above liquid crystal panel, and a display panel disposed on a rear side of the liquid crystal panel.

According to another aspect of the disclosure, there is provided a display device including the above liquid crystal panel, a backlight device disposed on a rear side of the liquid crystal panel, and a display panel disposed on a front side of the liquid crystal panel.

According to another aspect of the disclosure, there is provided a light control device including the above liquid crystal panel, and a pair of polarizing plates disposed in a crossed-Nichols state, with the liquid crystal panel interposed therebetween.

DESCRIPTION OF THE EMBODIMENTS

Figure 1:
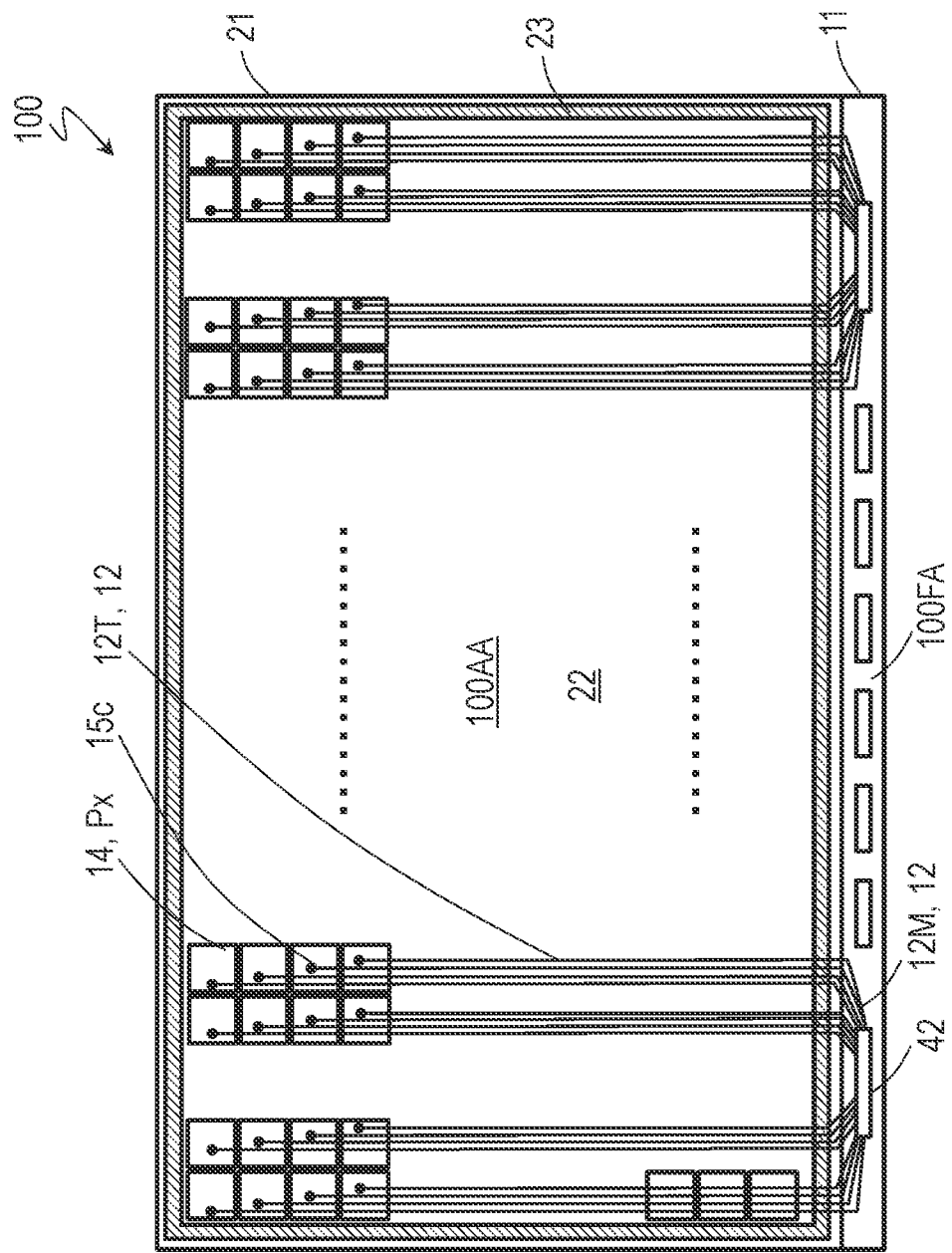
FIG. 1 is a schematic plan view of a liquid crystal panel according to an embodiment of the present disclosure.

A liquid crystal panel according to an embodiment of the present disclosure is a normally-black mode liquid crystal panel that includes a first substrate, a second substrate, and a liquid crystal layer disposed between the first substrate and the second substrate, and includes an active region in which a plurality of pixels are arrayed, and a frame region on the periphery of the active region. The plurality of pixels each include: the liquid crystal layer; and a pixel electrode and a common electrode for applying voltage to the liquid crystal layer. The liquid crystal panel includes a plurality of signal lines that are each electrically connected to a pixel electrode of a corresponding pixel out of the plurality of pixels, and is configured to apply signal voltage corresponding to the plurality of signal lines at substantially the same timing.

The normally-black mode liquid crystal panel may be, for example, a vertical electric field mode (e.g., vertical alignment (VA) mode) liquid crystal panel in which pixel electrodes are disposed on the first substrate and a common electrode is disposed on the second substrate, or may be a lateral electric field mode (e.g., fringe-field switching (FFS)

mode) liquid crystal panel in which both the pixel electrodes and the common electrode are disposed on the first substrate. Note that the term "normally-black mode liquid crystal panel" refers to a liquid crystal panel that operates in normally-black mode when a pair of polarizing plates are disposed in a crossed-Nichols state, interposing a liquid crystal panel therebetween.

Now, as viewed from a direction of the normal of the first substrate, the plurality of pixels are arrayed in substantial tessellation in the active region. The plurality of pixels are arrayed orderly, such as in a matrix, for example. The plurality of pixels desirably have substantially the same shape, as viewed from the direction of the normal of the first substrate. The plurality of pixels may be triangular, square, or hexagonal, for example, as viewed from the direction of the normal of the first substrate. Regular triangular, regular quadrilateral, and regular hexagonal shapes are capable of tessellation by a single type.

The liquid crystal panel according to the embodiment includes a plurality of auxiliary electrodes that each have a portion overlapping a gap between two pixels that are adjacent to each other. The plurality of pixel electrodes, the common electrode, the plurality of auxiliary electrodes, and portions of the plurality of signal lines which are present in the active region are made of a transparent electroconductive material. Each of the plurality of auxiliary electrodes is electrically connected to one of two pixel electrodes of the two pixels.

Thus, supplying the same voltage as one of the two pixel electrodes of the two pixels to the auxiliary electrode having a portion overlapping the gap between the two pixels that are adjacent enables formation of a dark line between the two pixels that are adjacent to be reduced, by facilitating matching of the alignment of liquid crystal molecules of the two adjacent pixels with the alignment of liquid crystal molecules in one of the pixels.

In a case of disposing the auxiliary electrode having the portion overlapping the gap between two pixels that are adjacent to each other as viewed from the direction of the normal of the first substrate, the auxiliary electrode is desirably disposed further having a portion that overlaps one of the two pixels that are adjacent to each other, taking alignment error and so forth into consideration, and the auxiliary electrode is even more desirably disposed further having a portion that overlaps the other of the two pixels that are adjacent to each other.

Also, the orientation of the electric field applied to the liquid crystal layer in the pixels, and the orientation of the electric field applied to the liquid crystal layer present between the two pixels that are adjacent is desirably equal, and the polarity of signal voltage supplied to all pixel electrodes is desirably the same. A configuration is desirably made in which the polarity of the signal voltage is inverted at substantially unchanged time intervals, and in which signal voltage applied to a certain pixel electrode and signal voltage applied to a pixel electrode adjacent to the certain pixel electrode are of the same polarity at any time. That is to say, the liquid crystal panel according to the embodiment of the present disclosure is desirably frame-inversion driven.

The plurality of pixels in the active region have congruent shapes, for example, and are orderly arrayed in tessellation in a matrix form. When the pixels are triangular, there are three pixels adjacent to one pixel, when the pixels are square, there are four pixels adjacent to one pixel, and when the pixels are hexagonal, there are six pixels adjacent to one pixel.

An example of a segment liquid crystal panel, and a display device and a light control device that have the segment liquid crystal panel, according to the embodiment of the present disclosure, will be described below with reference to the drawings. The segment liquid crystal panel, and the display device and light control device that have the segment liquid crystal panel, according to the embodiment of the present disclosure, are not limited to those exemplified below.

A liquid crystal panel 100 illustrated in FIG. 1 includes a first substrate 11, a second substrate 21 and a liquid crystal layer (not shown) disposed between the first substrate 11 and the second substrate 21, and also includes an active region 100AA in which a plurality of pixels Px are arrayed, and a frame region 100FA on the periphery of the active region 100AA. A sealing region at which the first substrate 11 and the second substrate 21 are bonded to each other is covered by a light shielding layer 23. In the frame region 100FA, the first substrate 11 is exposed from the second substrate 21, and a source driver (signal wiring driving circuit) 42 is mounted on the first substrate 11. Note that auxiliary electrodes are not illustrated in FIG. 1, and that the auxiliary electrodes will be described with reference to FIGS. 2A and 2B.

Each of the plurality of pixels Px has: the liquid crystal layer; and a pixel electrode (segment electrode) 14 and a common electrode 22 for applying voltage to the liquid crystal layer, and may have a substantially square (a regular quadrilateral here) external shape as viewed from the direction of the normal of the first substrate 11. The external shape of each of the plurality of pixels Px is substantially defined by the outer shape of the pixel electrode 14. A configuration is made such that corresponding signal voltage is applied to the pixel electrodes 14 of each of the plurality of pixels Px via the signal line 12, at substantially the same timing. Signal voltage output from the source driver 42 is directly supplied to each pixel electrode 14 via a signal line 12 over a predetermined period (e.g., frame period), as exemplified here. Each of a plurality of pixel electrodes 14 is electrically connected to a corresponding signal line 12 out of a plurality of signal lines 12, at a contact hole 13c. Of the signal lines 12, portions 12T in the active region 100AA are made of a transparent electroconductive material (e.g., indium tin oxide (ITO), indium zinc oxide (IZO)), and portions 12M within the frame region 100FA are formed of metal (e.g., aluminum, copper).

The pixel electrodes 14, the signal lines 12, contact holes 15c, and so forth, are formed in the liquid crystal panel 100, on the surface of the first substrate 11 on the liquid crystal layer side thereof, and the common electrode 22 is formed on the surface of the second substrate 21 on the liquid crystal layer side thereof so as to face the plurality of pixel electrodes 14. The liquid crystal panel 100 has vertical alignment films formed on the first substrate 11 and the second substrate 21 so as to come into contact with the liquid crystal layer, for example, and operates in normally-black mode. The liquid crystal panel 100 becomes a normally-black mode liquid crystal display panel by disposing a pair of polarizing plates in a crossed-Nichols state so that the liquid crystal panel 100 is interposed therebetween, for example.

Figure 2A:
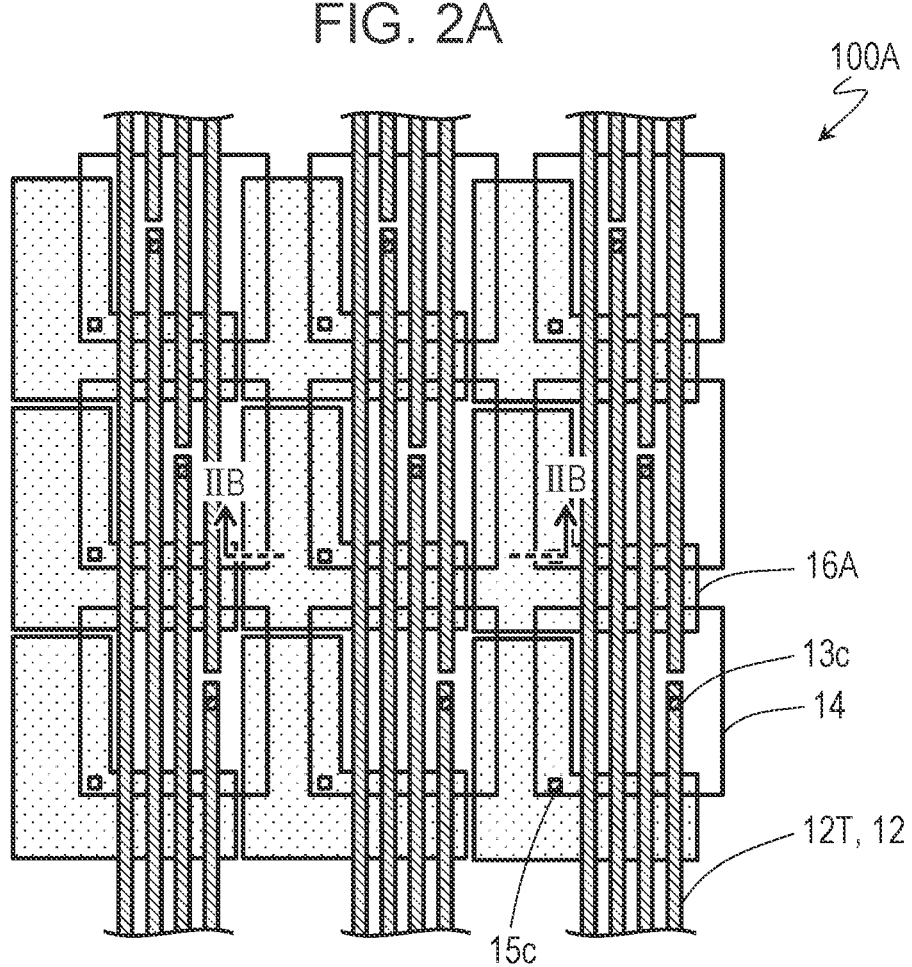
FIG. 2A is a schematic partially enlarged view of a liquid crystal panel according to the embodiment of the present disclosure.
Figure 2B:
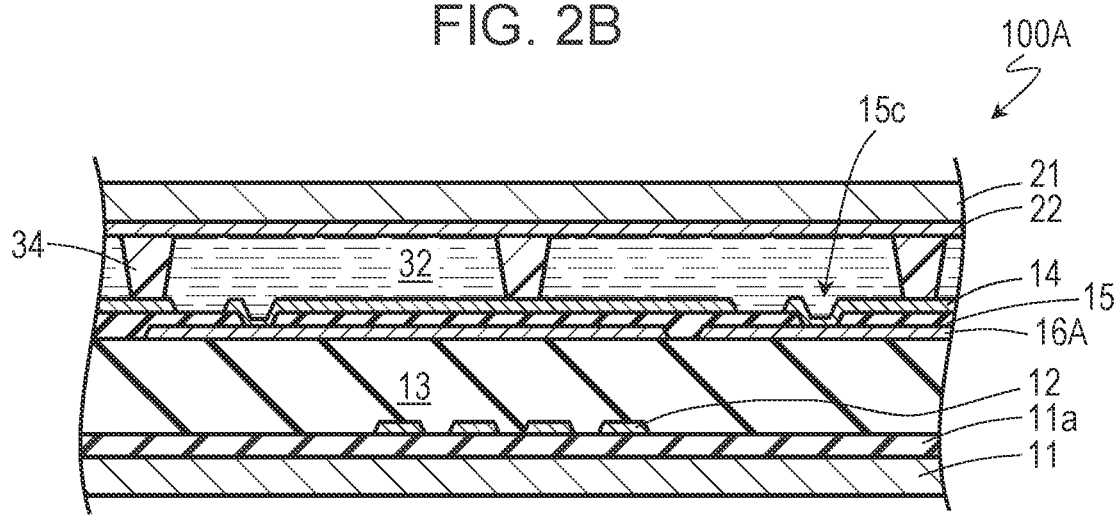
FIG. 2B is a schematic sectional view of the liquid crystal panel according to the embodiment of the present disclosure, taken along line IIB-IIB in FIG. 2A.

FIGS. 2A and 2B will be referenced. FIG. 2A is a schematic partially enlarged view of a liquid crystal panel 100A according to the embodiment of the present disclosure, and FIG. 2B is a schematic sectional view of the liquid crystal panel 100A, taken along line IIB-IIB in FIG. 2A. As illustrated in FIG. 2A, the plurality of pixel electrodes 14 are each electrically connected to a corresponding signal line 12T by the contact hole 13c. Note that dummy signal lines 12T (portions present on the upper side from the contact hole 13c in FIG. 2A) that are not connected to the source driver 42 are also formed, in order to make the distribution of transmissivity within the active region 100AA to be uniform. No metal wiring or black matrix is present in the active region 100AA, whereby high transmissivity is realized, and occurrence of moiré can be suppressed when being used stacked with other display panels.

As illustrated in FIG. 2A, an auxiliary electrode 16A may have a first portion that is parallel to a first side (e.g., horizontal direction) of the pixel that is a regular quadrilateral, and a second portion that is parallel to a second side (e.g., vertical direction) that is adjacent to the first side, which may be integrally formed and have a letter L shape. Although providing the auxiliary electrode 16A that has the letter L shape for the pixel that is a regular quadrilateral is desirable, which will be described later, the auxiliary electrode 16A may have just a portion parallel to one side. For example, in a case of a configuration for performing display in the lateral electric field mode, in which the common electrode has a plurality of linear portions extending in parallel with gaps therebetween, the auxiliary electrode may have just the portion parallel to a direction intersecting the plurality of linear portions.

The liquid crystal panel 100A is a VA mode liquid crystal panel and has, for example, a sectional structure such as schematically illustrated in FIG. 2B.

The liquid crystal panel 100A includes the first substrate 11, an inorganic insulating layer (e.g., a silicon nitride ($SiN_x$) layer) 11a formed on the surface of the first substrate 11, and the signal line 12 formed on the inorganic insulating layer 11a. An organic insulating layer 13 is formed so as to cover the signal line 12, and the auxiliary electrode 16A is formed on the organic insulating layer 13. An inorganic insulating layer (e.g., $SiN_x$ layer) 15 is formed on the auxiliary electrode 16A, and the pixel electrode 14 is formed on the inorganic insulating layer 15. The pixel electrode 14 and the auxiliary electrode 16A are electrically connected at the contact hole 15c of the inorganic insulating layer 15. Electrical connection of the signal line 12 and the pixel electrode 14 may be realized by forming, in the contact hole 13c formed in the organic insulating layer 13, a contact hole in the inorganic insulating layer 15 as well.

The liquid crystal panel 100A has the second substrate 21 disposed so as to face the first substrate 11 across the liquid crystal layer 32, and the common electrode 22 is formed on the surface of the second substrate 21 toward the liquid crystal layer 32. A vertical alignment film (not shown) is formed so as to cover the pixel electrode 14 and the common electrode 22. The thickness of the liquid crystal layer 32 (cell gap) is controlled and maintained by photo spacers 34 formed of photosensitive resin, for example.

Figure 3:
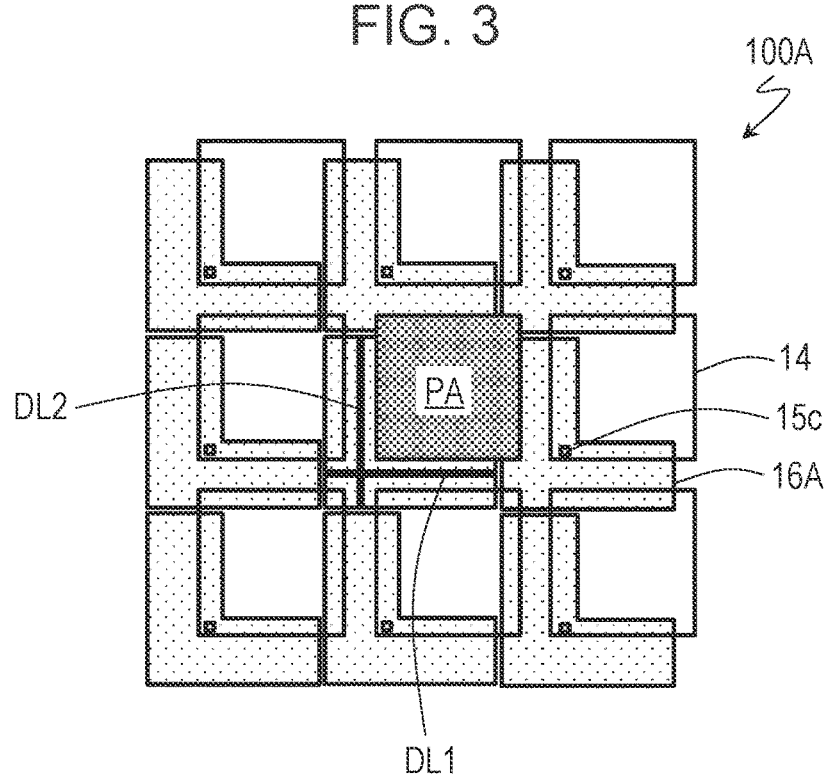
FIG. 3 is a schematic diagram illustrating a state of occurrence of dark lines in which a pixel displays black and other pixels display white, in the liquid crystal panel according to the embodiment of the present disclosure.

Next, a desirable shape of the auxiliary electrode 16 will be described with reference to FIGS. 3 to 5B. FIG. 3 is a schematic diagram illustrating a state of occurrence of dark lines in which a pixel PA displays black and other pixels display white, in the liquid crystal panel 100A.

Formation of dark lines among pixels in at least a white display state can be reduced by forming the auxiliary electrode 16 so as to have a portion overlapping a gap between pixels that are adjacent. However, dark lines may occur in other display state as well.

For example, FIG. 3 is a schematic diagram illustrating a state of occurrence of dark lines in which the pixel PA (middle of drawing) displays black and other pixels display white, in the liquid crystal panel 100A. In this case, a dark line DL1 (horizontal direction) and a dark line DL2 (vertical direction) are formed just on the periphery of the pixel PA, as illustrated in FIG. 3. The pixel PA is displaying black, and accordingly the dark line DL1 and the dark line DL2 are not conspicuous.

Figure 4:
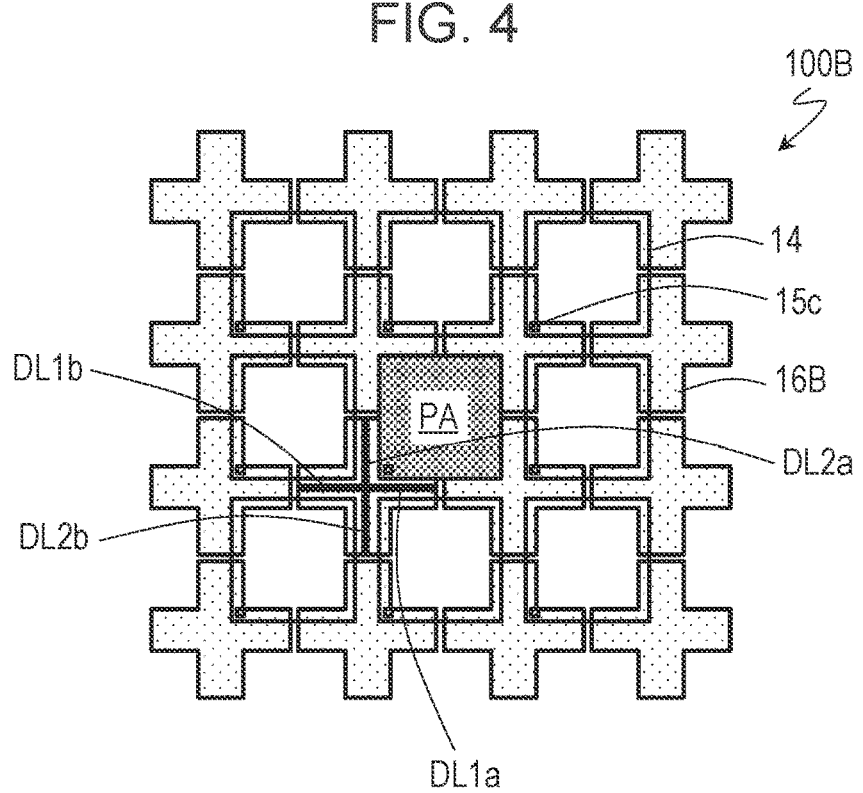
FIG. 4 is a schematic diagram illustrating a state of occurrence of dark lines in which the pixel displays black and other pixels display white, in a liquid crystal panel according to the embodiment of the present disclosure.

Conversely, in a case of disposing four auxiliary electrodes 16B that are cross-shaped, illustrated in FIG. 4, on the periphery of the pixel PA, dark lines DL1a, DL1b, DL2a, and DL2b are formed in a cross shape at the position overlapping the auxiliary electrode 16B electrically connected to the pixel electrode 14 of the pixel PA. Of these dark lines, the dark lines DL1a and DL2a are situated on the periphery of the pixel PA and are not conspicuous, but the dark lines DL1b and DL2b are situated on the periphery of pixels displaying white, and accordingly are conspicuous.

Accordingly, it can be seen that the auxiliary electrode 16A having the letter-L shape illustrated in FIG. 3 is desirable. That is to say, it is desirable that the auxiliary electrode 16A has a first portion that is parallel to the first side (e.g., horizontal direction) of the pixel that is a regular quadrilateral, and a second portion that is parallel to the second side (e.g., vertical direction), and that the first portion has a portion that overlaps almost the entire first side, and the second portion has a portion that overlaps almost the entire second side. The first portion and the second portion each independently desirably have lengths that are at least 60% or longer than the length of the first side and the length of the second side.

The auxiliary electrodes 16A and 16B illustrated in FIGS. 3 and 4 all have substantially the same external shape (congruent shape), which is favorable in that the electrical load due to the auxiliary electrodes 16A and 16B is the same at all pixels. Also, each of the plurality of auxiliary electrodes 16A and 16B may be disposed to substantially match another of the auxiliary electrodes 16A and 16B when translated in the horizontal direction and the vertical direction in a plane that is parallel to the first substrate 11. Further, relative positions of the contact holes 15c on the plurality of auxiliary electrodes 16A are desirably substantially the same. This is favorable in that a photomask or the like for forming the auxiliary electrodes 16A and 16B can be simplified. As illustrated in FIG. 3, in a case in which the pixels are regular quadrilaterals, three of the letter-L shaped auxiliary electrodes are desirably disposed on the periphery of each pixel.

Figure 5A:
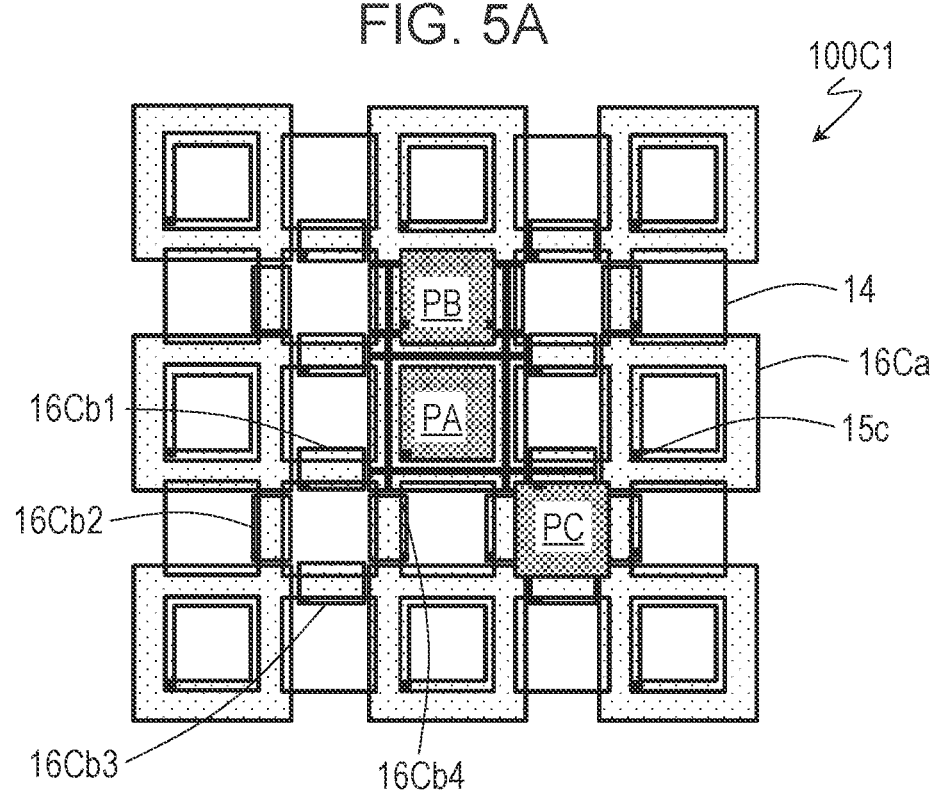
FIG. 5A is a schematic diagram illustrating a state of occurrence of dark lines in which pixels display black and other pixels display white, in a liquid crystal panel according to the embodiment of the present disclosure.

FIG. 5A is a schematic diagram illustrating a state of occurrence of dark lines in which pixels PA, PB and PC display black and other pixels display white, in a liquid crystal panel 100C1 according to the embodiment of the present disclosure. The liquid crystal panel 100C1 has auxiliary electrodes 16Ca having shapes surrounding the pixels, and small auxiliary electrodes 16Cb1, 16Cb2, 16Cb3, and 16Cb4 that overlap gaps between the auxiliary electrodes 16Ca that are adjacent.

Due to providing such auxiliary electrodes 16Ca, 16Cb1, 16Cb2, 16Cb3, and 16Cb4, dark lines are formed only at the peripheries of the pixels PA, PB, and PC that display black, as illustrated in FIG. 5A, and accordingly are not conspicuous. However, the presence of auxiliary electrodes of different shapes causes the electrical load due to the auxiliary electrodes to differ among the pixels, which may cause variance in transmissivity. There also is a problem that the photomask or the like for forming the auxiliary electrodes 16Ca, 16Cb1, 16Cb2, 16Cb3, and 16Cb4 will become complicated.

Figure 5B:
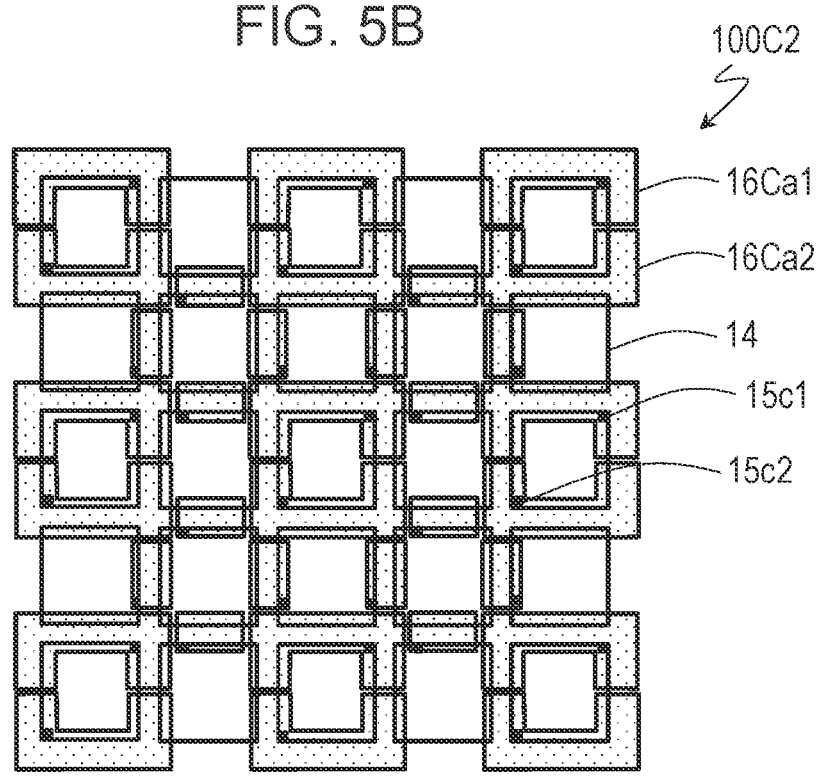
FIG. 5B is a schematic partially enlarged diagram of a liquid crystal panel according to the embodiment of the present disclosure.

FIG. 5B is a schematic partially enlarged diagram of a liquid crystal panel 100C2 according to the embodiment of the present disclosure. Instead of the auxiliary electrodes 16Ca having the shape surrounding the pixels of the liquid crystal panel 100C1 illustrated in FIG. 5A, the liquid crystal panel 100C2 has sets of two auxiliary electrodes 16Ca1 and 16Ca2, upper and lower.

Figure 6A:
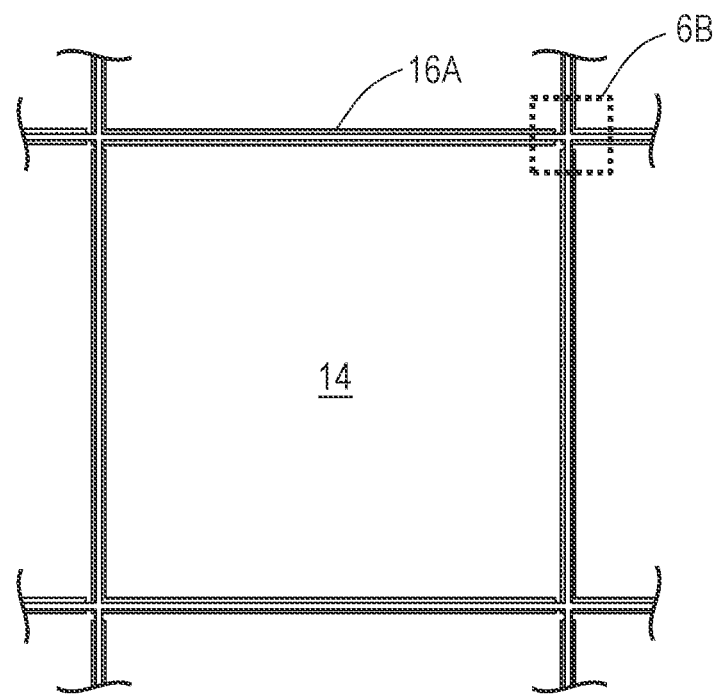
FIG. 6A is a schematic plan view for describing a specific example of size in the liquid crystal panel.
Figure 6B:
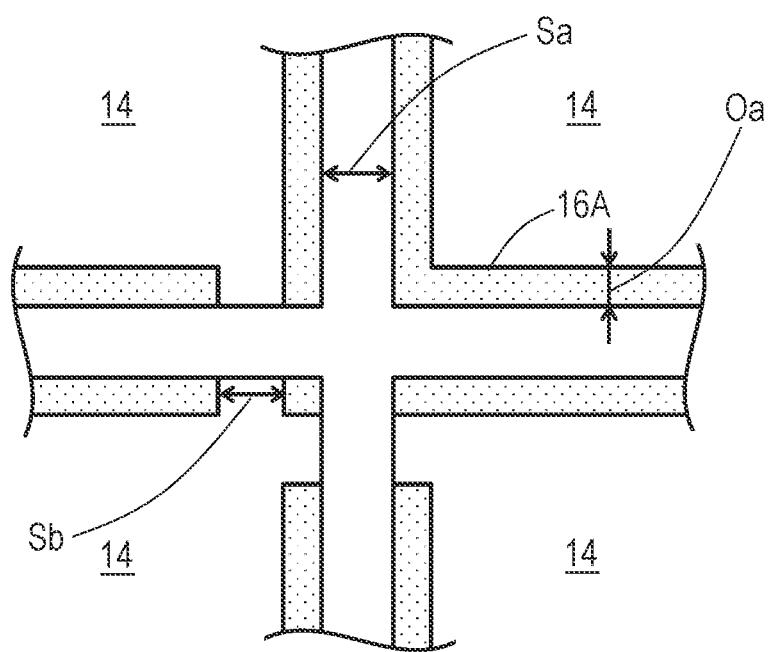
FIG. 6B is an enlarged view of a region surrounded by a dashed line 6B in FIG. 6A.

Next, a specific example of size in the liquid crystal panel 100A will be described with reference to FIGS. 6A and 6B. FIG. 6B is an enlarged view of a region surrounded by a dashed line 6B in FIG. 6A.

The pixel electrodes 14 are regular quadrilaterals of which the length of one side is 320 µm, space Sa between pixel electrodes 14 that are adjacent is 5 µm, space Sb between auxiliary electrodes 16A that are adjacent is 5 µm, and overlap width Oa between pixel electrodes 14 and auxiliary electrodes 16A is 3 µm.

Dark lines are readily visually observed in liquid crystal panels that have such relatively large pixels, and accordingly providing the auxiliary electrodes according to the present disclosure particularly yields marked effects.

Figure 7A:
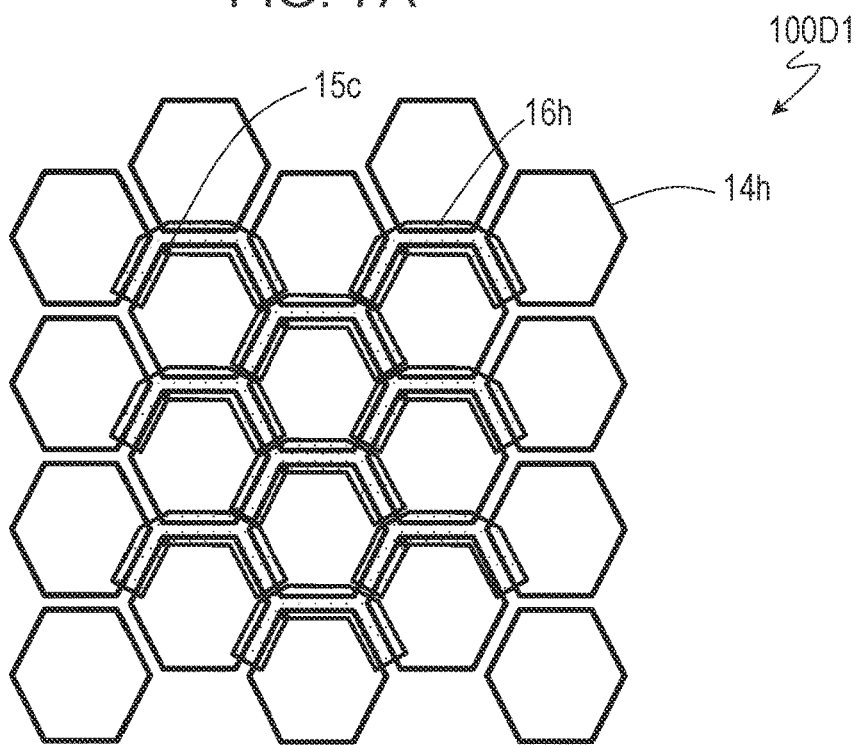
FIG. 7A is a schematic partially enlarged view of a liquid crystal panel according to the embodiment of the present disclosure.

FIG. 7A illustrates an example of the shape and layout of auxiliary electrodes 16h that are suitable for a liquid crystal panel 100D1 that has pixel electrodes 14h having regular hexagonal outer shapes.

When the pixel electrode 14h is a regular hexagon, the auxiliary electrode 16h desirably has a first portion that is parallel to a first side of the pixel electrode 14h, a second portion that is parallel to a second side adjacent to the first side, and a third portion that is parallel to a third side adjacent to the second side, and the first portion, the second portion, and the third portion are desirably formed integrally. At this time, four auxiliary electrodes are desirably disposed on the periphery of a certain pixel.

Figure 7B:
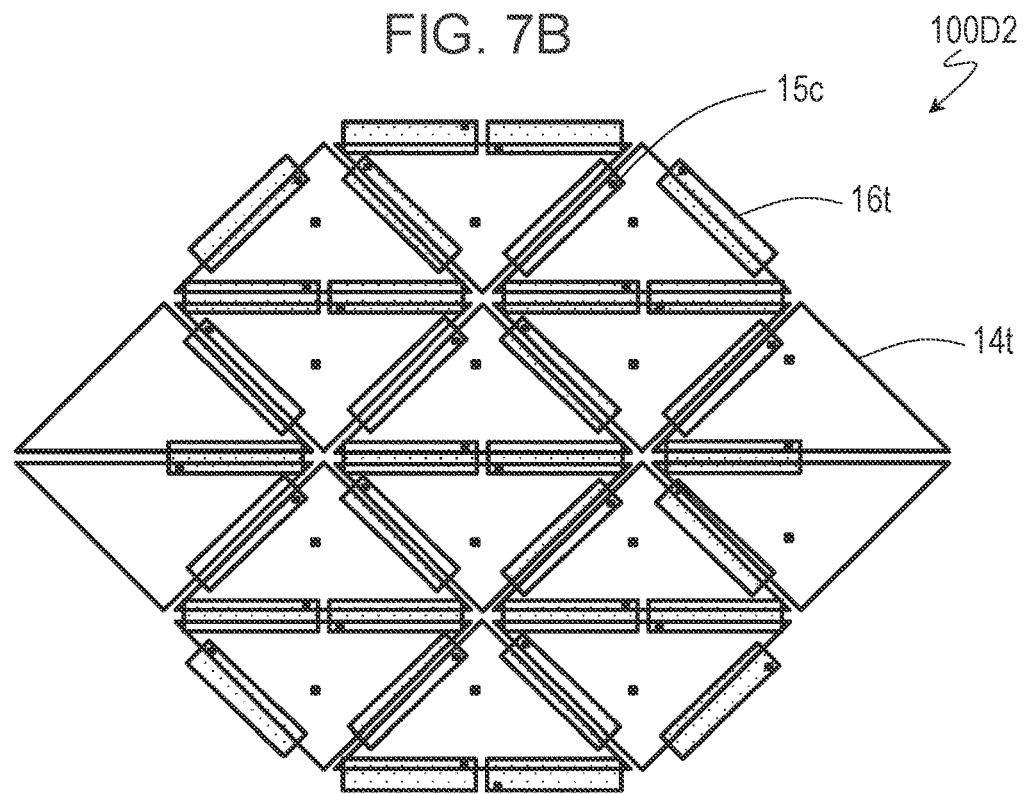
FIG. 7B is a schematic partially enlarged view of a liquid crystal panel according to the embodiment of the present disclosure.

FIG. 7B illustrates an example of the shape and layout of auxiliary electrodes 16t that are suitable for a liquid crystal panel 100D2 that has pixel electrodes 14t having triangular outer shapes. More triangles are used for tessellation than squares or hexagons, and accordingly squares or hexagons are desirable for the outer shape of the pixel electrodes.

Next, a desirable connection form of the signal line 12T and the pixel electrode 14 will be described with reference to FIGS. 8A and 8B.

Figure 8A:
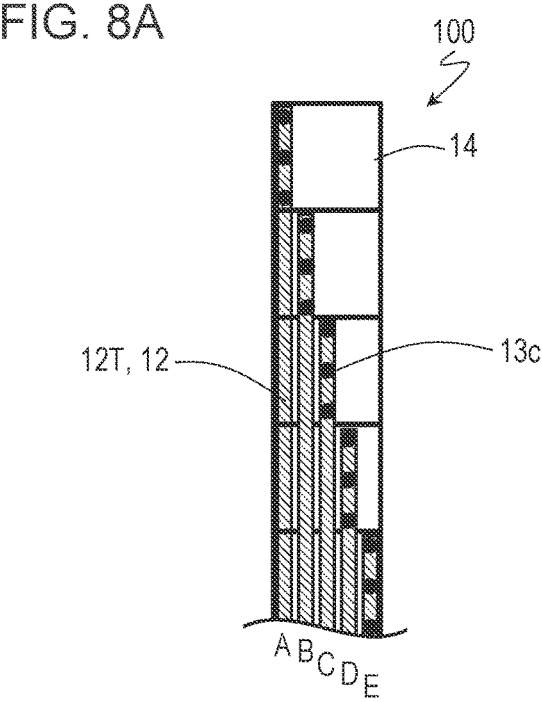
FIG. 8A is a schematic plan view illustrating an example of a connection form of signal lines and pixel electrodes in the liquid crystal panel according to the embodiment of the present disclosure.
Figure 8B:
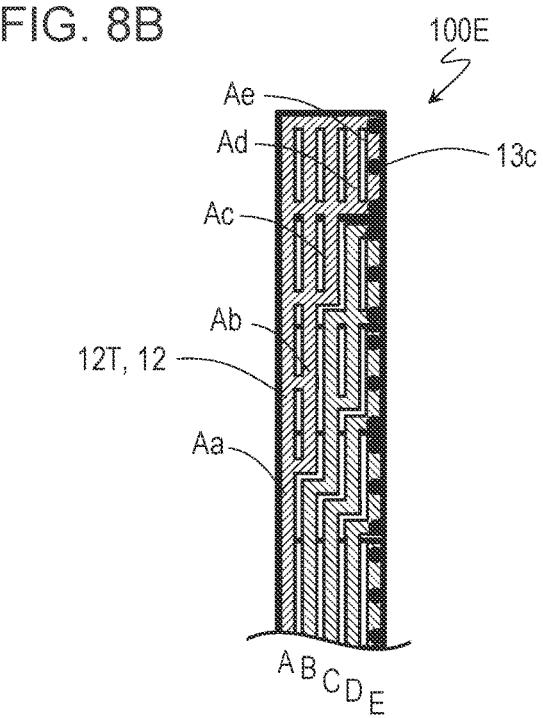
FIG. 8B is a schematic plan view illustrating an example of a desirable connection form of signal lines and pixel electrodes in a liquid crystal panel according to the embodiment of the present disclosure.

FIG. 8A is a schematic plan view illustrating an example of a connection form of the signal lines 12T and the pixel electrodes 14 in the liquid crystal panel 100 according to the embodiment of the present disclosure, and FIG. 8B is a schematic plan view illustrating an example of a desirable connection form of the signal lines 12T and the pixel electrodes 14 in a liquid crystal panel 100E according to the embodiment of the present disclosure.

As illustrated in FIG. 8A, the length of the signal line 12T (the length from the output of the source driver to the connection portion (contact hole 13c) to the pixel electrode 14) differs depending on the signal line. In the example illustrated here, the length decreases in the order of signal lines A, B, C, D, and E. The signal lines 12T are made of a transparent electroconductive material, and accordingly resistance is relatively high. In the liquid crystal panel 100E illustrated in FIG. 8B, the resistance of the signal lines 12T is lowered by effectively using regions where no signal lines 12T were formed in the liquid crystal panel 100 in FIG. 8A. Observing the signal line A in FIG. 8B, the signal line A has a portion Aa that is the same as the signal line A in the liquid crystal panel 100, a portion Ab of the signal line B in the liquid crystal panel 100, a portion Ac of the signal line C in the liquid crystal panel 100, a portion Ad of the signal line D in the liquid crystal panel 100, and a portion Ae of the signal line E in the liquid crystal panel 100. Accordingly, the signal lines of the liquid crystal panel 100E have lower resistance than the signal lines of the liquid crystal panel 100 except for the signal line E, and the longer the signal line is, the greater the effects of low resistance are.

Figure 9:
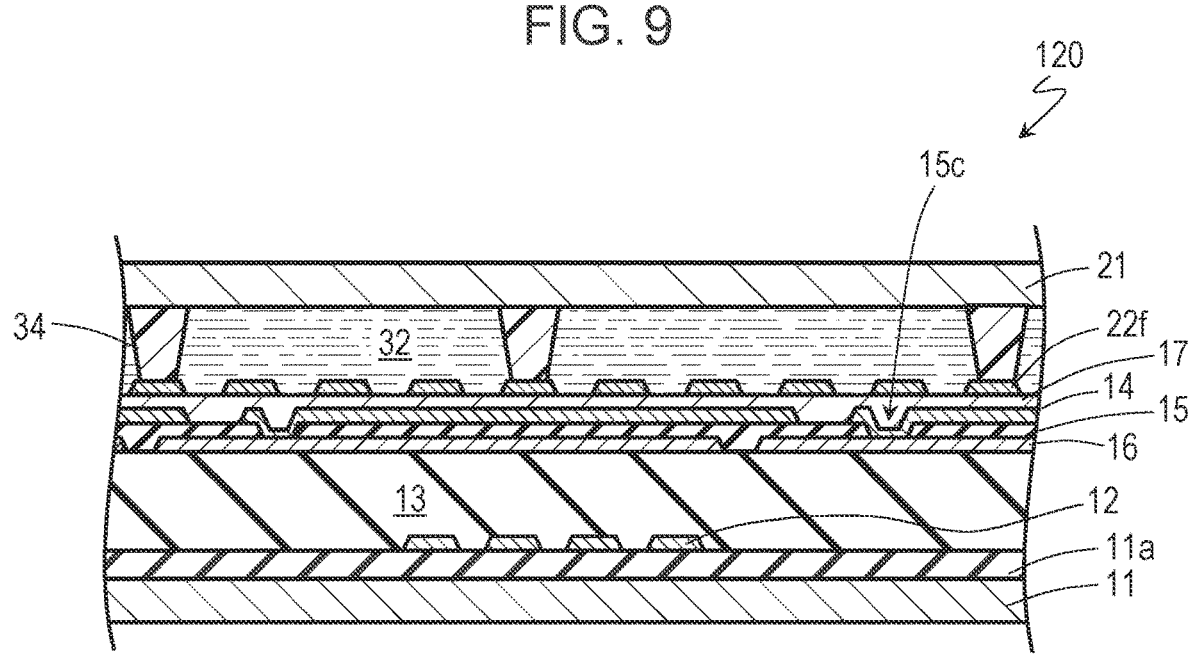
FIG. 9 is a schematic sectional view of a liquid crystal panel according to the embodiment of the present disclosure, corresponding to FIG. 2B.

Although a vertical alignment mode liquid crystal panel has been exemplified above, an FFS mode liquid crystal panel 120 illustrated in FIG. 9 can be used. In the liquid crystal panel 120, a common electrode 22f is formed on the first substrate 11, and the common electrode 22f has a plurality of linear portions extending in parallel with gaps therebetween. At this time, the auxiliary electrodes 16 may have a portion (letter-I shape) extending in parallel to a direction intersecting the plurality of linear portions.

Figure 10:
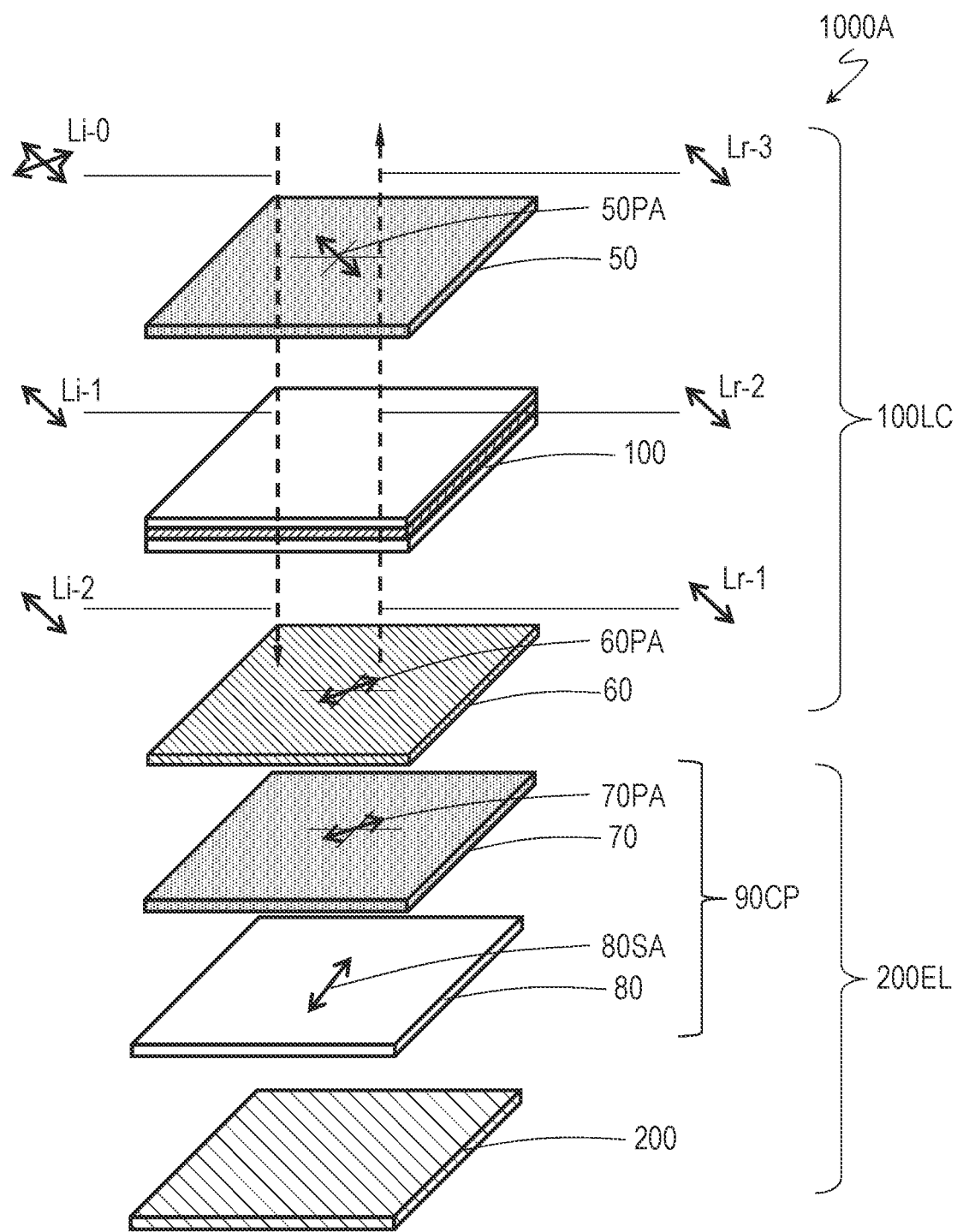
FIG. 10 is a schematic diagram illustrating operations in a state in which the liquid crystal panel is off (reflective display) in a display device that has the liquid crystal panel and an organic electroluminescent (EL) display panel, according to the embodiment of the present disclosure.

Next, an example of a display device having the liquid crystal panel according to the embodiment of the present disclosure will be described with reference to FIGS. 10 to 12. In FIGS. 10 to 12, arrows indicate polarization direction (linearly polarized light, circularly polarized light, and unpolarized light).

A display device 1000A illustrated in FIGS. 10 to 12 has a reflective liquid crystal display element 100LC that includes the liquid crystal panel 100 according to the embodiment of the present disclosure, and an organic EL display element 200EL. That is to say, the display device 1000A has an organic EL display element 200 as a display panel disposed on a rear side of the liquid crystal panel 100. The pixels that the liquid crystal panel 100 has are disposed such that light emitted from two or more pixels of the display panel 200 passes therethrough.

The reflective liquid crystal display element 100LC is a reflective liquid crystal display element using a reflective polarizing plate, and is also referred to as a reflective-polarizing-plate reflective liquid crystal display element. The organic EL display element 200EL has the organic EL display panel 200 and a circular polarizing plate 90CP. The reflective liquid crystal display element 100LC and the organic EL display element 200EL can have a structure of being stacked via an adhesive layer (not shown), for example. The reflective liquid crystal display element 100LC and the organic EL display element 200EL can each independently perform reflective display and light-emitting display. Note that a scattering layer (light diffusion layer) may be disposed on an observer side of a polarizing plate 50.

Polarizing plates 50 and 70 are each absorptive polarizing plates, and absorb linearly polarized light in polarization directions orthogonal to polarized light transmission axes 50PA and 70PA. A reflective polarizing plate 60 reflects linearly polarized light of a polarization direction orthogonal to a polarized light transmission axis 60PA. The circular polarizing plate 90CP is made up of the polarizing plate 70 and a waveplate (quarter-wave plate) 80, and is disposed such that the polarized light transmission axis 70PA and a slow axis 80SA form an angle of 45°. The circular polarizing plate 90CP absorbs external light that enters the organic EL display panel 200 and is reflected at the organic EL display panel 200.

FIG. 10 is a schematic diagram illustrating operations in a state in which the liquid crystal panel 100 is off (reflective display) in the display device 1000A. The organic EL display panel 200 is also off. The liquid crystal panel 100 is of the normally-black mode, and accordingly in the off state, incident polarized light is not imparted with phase difference. Accordingly, out of incident unpolarized light Li-0, polarized light Li-1 that has passed through the polarizing plate 50 passes through the liquid crystal panel 100 without change, is reflected at the reflective polarizing plate 60, and is emitted as polarized light Lr-1, Lr-2, and Lr-3 with the polarization state maintained.

Figure 11A:
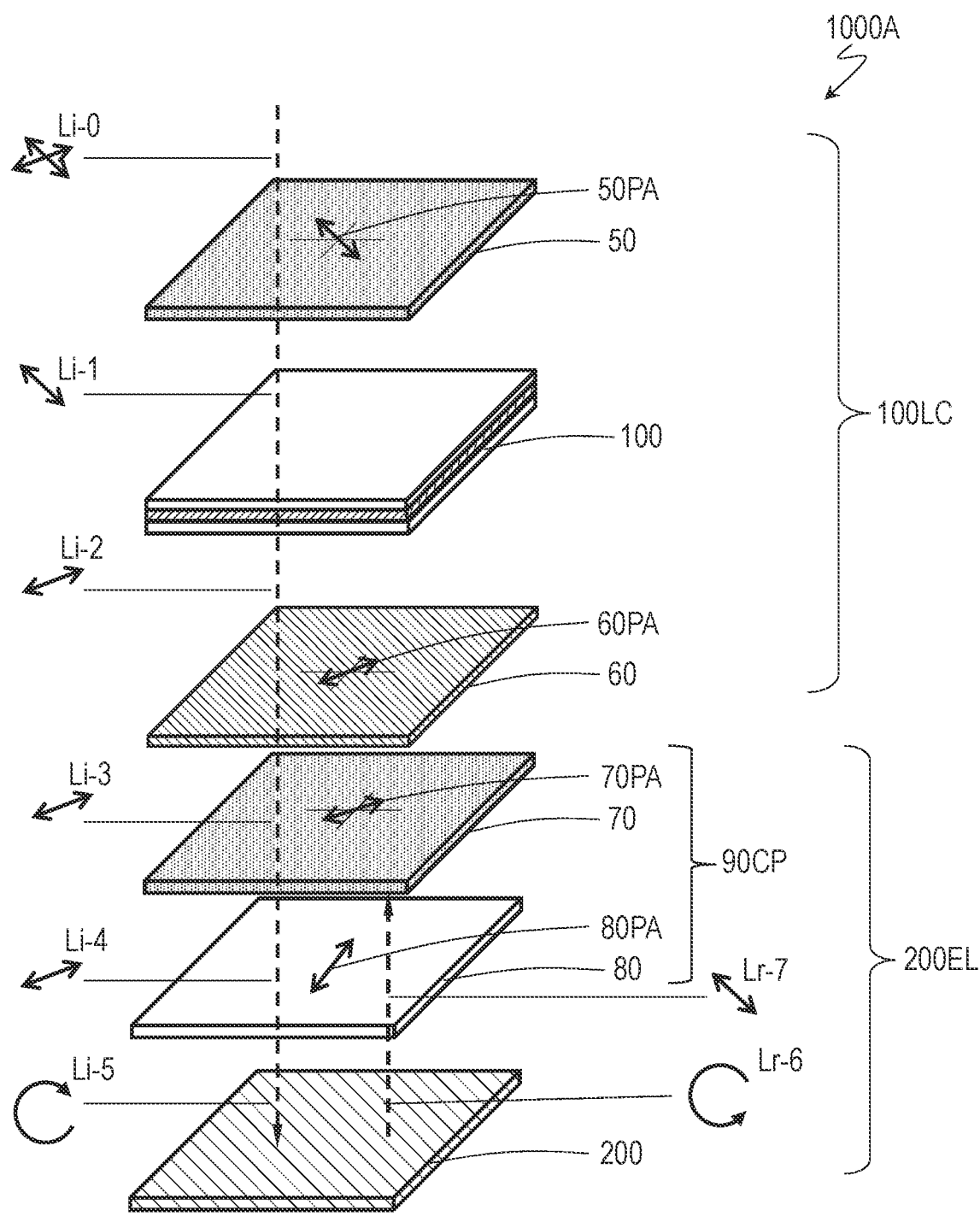
FIG. 11A is a schematic diagram illustrating operations in a state in which the liquid crystal panel is on in the display device, illustrating a state of display using external light (reflective display off)
Figure 11B:
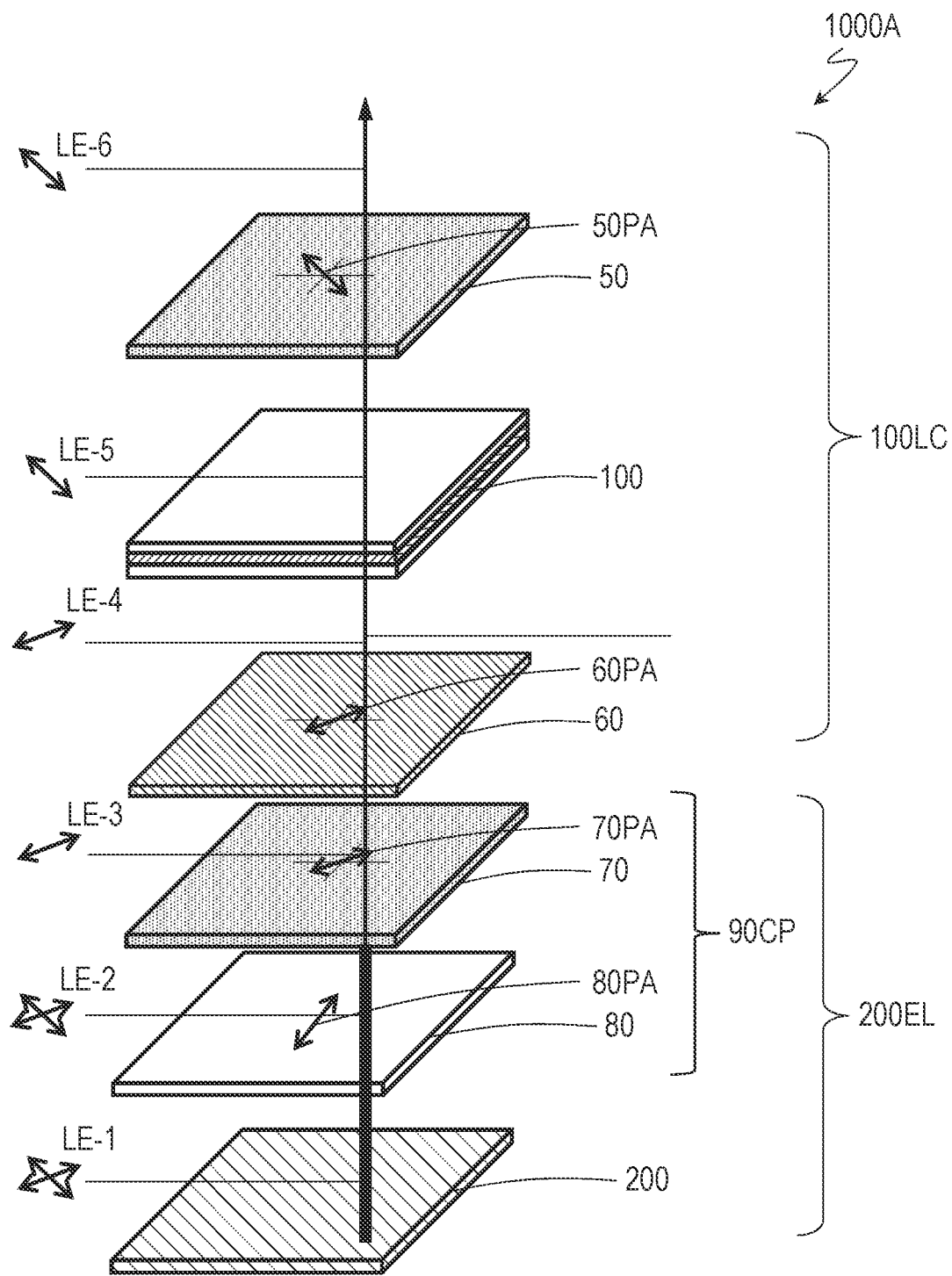
FIG. 11B is a schematic diagram illustrating operations in a state in which the liquid crystal panel is on in the display device, illustrating a state of display by the organic EL display panel.
Figure 12:
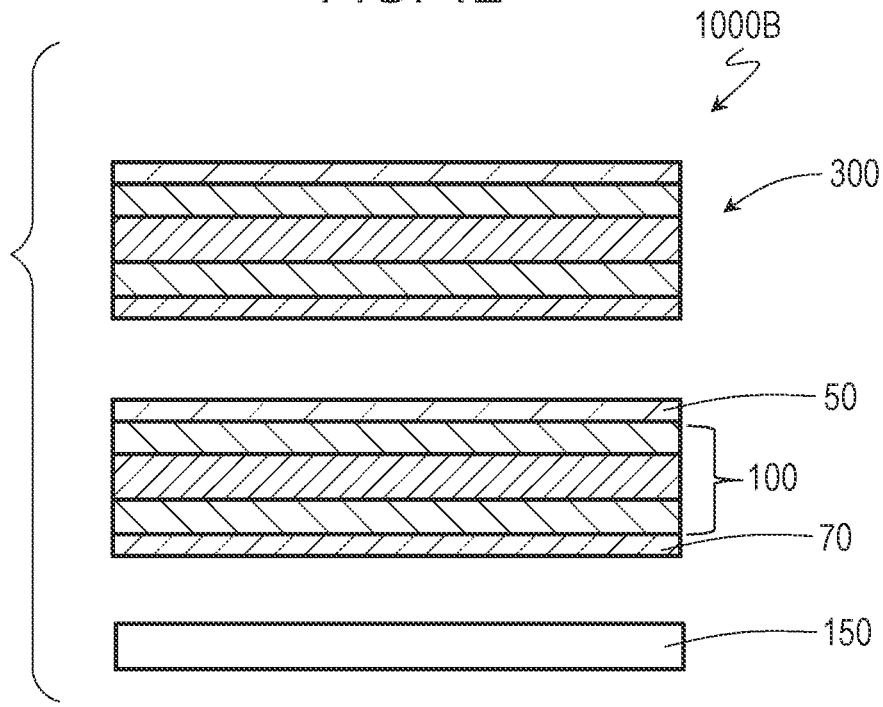
FIG. 12 is a schematic sectional view of a display device having the liquid crystal panel according to the embodiment of the present disclosure and a transmissive liquid crystal display panel.

FIG. 11A is a schematic diagram illustrating operations in a state in which the liquid crystal panel 100 is on in the display device 1000A, illustrating a state of display using external light (reflective display off), and FIG. 11B is a schematic diagram illustrating operations in a state in which the liquid crystal panel 100 is on in the display device 1000A, illustrating a state of display by the organic EL display panel 200.

A display device that can perform both reflective display using a liquid crystal display element and light-emitting display using an organic EL display element can be obtained by using the liquid crystal panel according to the embodiment of the present disclosure as a liquid crystal element layer described in Japanese Patent Application No. 2022-014177. In doing so, thin-film transistors electrically connected to the signal lines may be disposed in the frame region. The entirety of contents disclosed in Japanese Patent Application No. 2022-014177 is incorporated in the present specification by reference.

FIG. 12 is a schematic sectional view of a display device 1000B having the liquid crystal panel 100 according to the embodiment of the present disclosure and a transmissive liquid crystal display panel 300. The display device 1000B has a backlight 150, the transmissive liquid crystal display panel 300, and the liquid crystal panel 100 interposed therebetween. The polarizing plates 50 and 70 are disposed on both sides of the liquid crystal panel 100 in a crossed-Nichols state. Controlling light emitted from the backlight 150 by the liquid crystal panel enables a display with a high contrast ratio to be realized relatively inexpensively.

Figure 13:
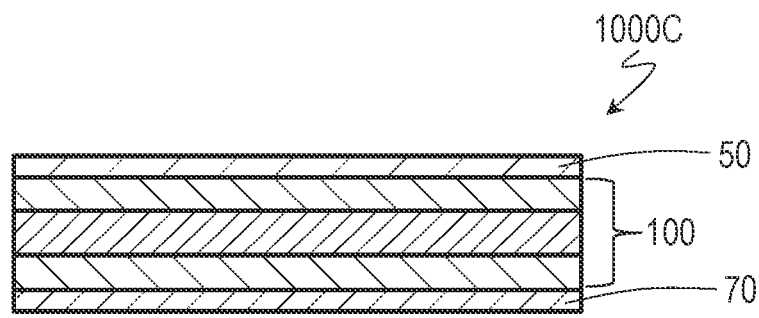
FIG. 13 is a schematic sectional view of a light control device having the liquid crystal panel, according to the embodiment of the present disclosure.

A light control device 1000C illustrated in FIG. 13 has the polarizing plates 50 and 70 disposed on both sides of the liquid crystal panel 100 in a in a crossed-Nichols state. This light control device 1000C is used as an automotive sunshade, for example.

The liquid crystal panel according to the embodiment of the present disclosure is suitably used as a display device and a light control device.

The present disclosure contains subject matter related to that disclosed in Japanese Priority Patent Application JP 2022-127422 filed in the Japan Patent Office on Aug. 9, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal panel, comprising:
a first substrate;
a second substrate;
a liquid crystal layer disposed between the first substrate and the second substrate;
an active region in which a plurality of pixels are arrayed, each of the plurality of pixels including
the liquid crystal layer, and
a pixel electrode and a common electrode for applying voltage to the liquid crystal layer;
a frame region on a periphery of the active region;
a plurality of signal lines, each of which being electrically connected to a pixel electrode of a corresponding pixel out of the plurality of pixels; and
a plurality of auxiliary electrodes, wherein
the liquid crystal panel is a normally-black mode liquid crystal panel that is configured to apply signal voltage corresponding to the plurality of signal lines at substantially a same timing,
the plurality of pixels are arrayed in substantial tessellation in the active region, as viewed from a direction of normal of the first substrate,
each of the auxiliary electrodes has a portion that overlaps a gap between two pixels that are adjacent to each other, as viewed from the direction of the normal of the first substrate,
a plurality of pixel electrodes, each of which being the pixel electrode for applying voltage to the liquid crystal layer, the common electrode, the plurality of auxiliary electrodes, and portions of the plurality of signal lines that are present in the active region are made of a transparent electroconductive material, and
each of the plurality of auxiliary electrodes is electrically connected to one of two pixel electrodes of the two pixels.

2. The liquid crystal panel according to claim 1, wherein the plurality of pixels have substantially a same shape, as viewed from the direction of the normal of the first substrate.

3. The liquid crystal panel according to claim 1, wherein each of the plurality of auxiliary electrodes further has a portion that overlaps one of the two pixels that are adjacent to each other, as viewed from the direction of the normal of the first substrate.

4. The liquid crystal panel according to claim 3, wherein each of the plurality of auxiliary electrodes further has a portion that overlaps an other of the two pixels that are adjacent to each other, as viewed from the direction of the normal of the first substrate.

5. The liquid crystal panel according to claim 1, wherein each of the plurality of auxiliary electrodes has a first portion that is parallel to a first side of one of the two pixels that are adjacent to each other.

6. The liquid crystal panel according to claim 5, wherein the first portion has a length of 60% or more of a length of the first side.

7. The liquid crystal panel according to claim 5, wherein each of the plurality of auxiliary electrodes has a second portion that is parallel to a second side that is adjacent to the first side, and the first portion and the second portion are integrally formed.

8. The liquid crystal panel according to claim 7, wherein the second portion has a length of 60% or more of a length of the second side.

9. The liquid crystal panel according to claim 7, wherein each of the plurality of auxiliary electrodes has a third portion that is parallel to a third side that is adjacent to the second side, and the first portion, the second portion, and the third are integrally formed.

10. The liquid crystal panel according to claim 5, wherein the liquid crystal panel is configured to perform display in a lateral electric field mode,
the common electrode has a plurality of linear portions extending in parallel with gaps therebetween, and
the first portion is parallel to a direction intersecting the plurality of linear portions.

11. The liquid crystal panel according to claim 1, wherein the liquid crystal panel is configured to perform display in a vertical electric field mode.

12. The liquid crystal panel according to claim 1, wherein two or more auxiliary electrodes out of the plurality of auxiliary electrodes are disposed on a periphery of a certain pixel.

13. The liquid crystal panel according to claim 1, wherein each of the plurality of pixels has a substantially square outer shape, as viewed from the direction of the normal of the first substrate, and three auxiliary electrodes out of the plurality of auxiliary electrodes are disposed on a periphery of a certain pixel.

14. The liquid crystal panel according to claim 1, wherein each of the plurality of pixels has a substantially hexagonal outer shape, as viewed from the direction of the normal of the first substrate, and four auxiliary electrodes out of the plurality of auxiliary electrodes are disposed on a periphery of a certain pixel.

15. The liquid crystal panel according to claim 1, wherein an outer shape of the plurality of auxiliary electrodes is substantially the same.

16. The liquid crystal panel according to claim 15, wherein each of the plurality of auxiliary electrodes is disposed so as to substantially match another auxiliary electrode when translated in a horizontal direction and a vertical direction in a plane that is parallel to the first substrate.

17. The liquid crystal panel according to claim 1, wherein each of the plurality of auxiliary electrodes and the pixel electrodes corresponding thereto are connected at contact holes formed in an insulating layer that is formed between the plurality of auxiliary electrodes and the plurality of pixel electrodes.

18. The liquid crystal panel according to claim 17, wherein relative positions of each of the plurality of auxiliary electrodes and the contact holes are substantially same, as viewed from the direction of the normal of the first substrate.

19. The liquid crystal panel according to claim 1, wherein the plurality of auxiliary electrodes are included in a first electroconductive layer.

20. The liquid crystal panel according to claim 19, wherein
the plurality of pixel electrodes are included in a second electroconductive layer,
the portions of the plurality of signal lines that are present in the active region are included in a third electroconductive layer, and
the first electroconductive layer is disposed between the second electroconductive layer and the third electroconductive layer.

21. The liquid crystal panel according to claim 1, wherein the liquid crystal panel is configured such that a polarity of the signal voltage is inverted at substantially unchanged time intervals, and the signal voltage applied to a certain pixel electrode and a signal voltage supplied to a pixel electrode adjacent to the certain pixel electrode are of a same polarity at any time.

22. The liquid crystal panel according to claim 1, wherein the portions of the plurality of signal lines that are present in the active region include portions that overlap the plurality of pixel electrodes, as viewed from the direction of the normal of the first substrate.

23. The liquid crystal panel according to claim 1, wherein the plurality of signal lines include a signal line that overlaps two or more pixel electrodes, as viewed from the direction of the normal of the first substrate.

24. The liquid crystal panel according to claim 1, further comprising:
a plurality of thin-film transistors, each of which being electrically connected to one of the plurality of signal lines, the plurality of thin-film transistors being disposed in the frame region.

25. The liquid crystal panel according to claim 1, wherein the liquid crystal panel does not have a black matrix that blocks light between the plurality of pixels, as viewed from the direction of the normal of the first substrate.

26. A display device, comprising:
the liquid crystal panel according to claim 1; and
a display panel disposed on a rear side of the liquid crystal panel.

27. The display device according to claim 26, wherein each of the plurality of pixels of the liquid crystal panel is disposed such that light emitted from two or more pixels of the display panel passes therethrough.

28. A display device, comprising:
the liquid crystal panel according to claim 1;
a backlight device disposed on a rear side of the liquid crystal panel; and
a display panel disposed on a front side of the liquid crystal panel.

29. A light control device, comprising:
the liquid crystal panel according to claim 1; and
a pair of polarizing plates disposed in a crossed-Nichols state, with the liquid crystal panel interposed therebetween.

* * * * *